G. A. HILBERT.
REPAIR DEVICE FOR RIMLESS EYEGLASSES.
APPLICATION FILED APR. 10, 1913.
1,087,657.
Patented Feb. 17, 1914.
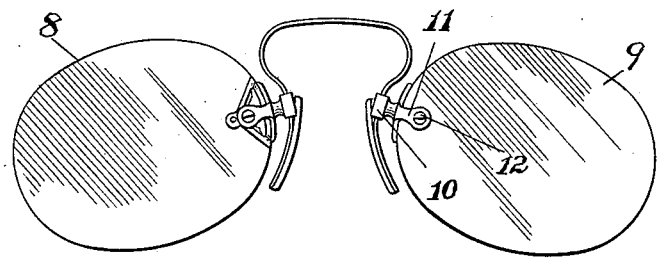
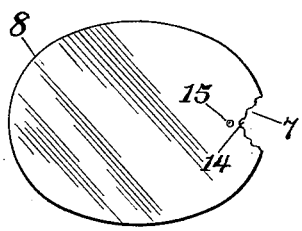
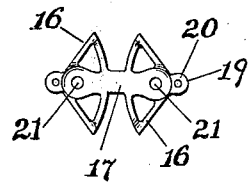
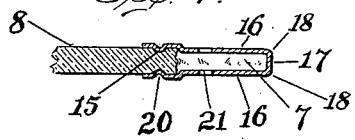
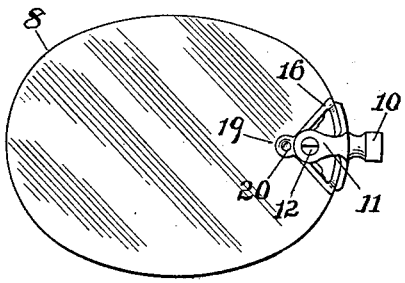
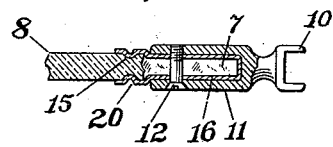
Witnesses
Edwin L. Bradford
G. Ferd. Vogt
Inventor
G. A. Hilbert
By Mann & Co
Attorneys

UNITED STATES PATENT OFFICE.

GEORGE ALBERT HILBERT, OF BALTIMORE, MARYLAND.

REPAIR DEVICE FOR RIMLESS EYEGLASSES.

1,087,657.  Specification of Letters Patent.  Patented Feb. 17, 1914.

Application filed April 10, 1913. Serial No. 760,091.

*To all whom it may concern:*

Be it known that I, GEORGE ALBERT HILBERT, citizen of the United States, residing at Baltimore, in the State of Maryland, have invented certain new and useful Improvements in Repair Devices for Rimless Eyeglasses, of which the following is a specification.

This invention relates to a new and useful repair device for rimless eyeglasses and spectacles.

To secure the style of optical lens termed "rimless" to a mounting—either a nosepiece or temple—it is usual to employ a forked post that straddles the edge of the glass lens, and fasten said forks to the lens by boring a hole in the lens and inserting a screw or rivet through the prongs and hole. This method of fastening the lens is desirable because neat and inexpensive, but it results in many of such lenses being broken at the place where the screw-hole is. This kind of a fracture will frequently have the shape indicated at, 7, in Fig. 2 of the drawing. It is very desirable to be able to promptly repair a breakage of this kind without obtaining a new lens, which in many cases could be procured only from a distance.

The object of this invention, therefore, is to provide a ready-made device of metal over which an ordinary forked post may straddle, said device having a screw-hole located to coincide with the position of the corresponding screw-hole in the prongs of the post, and said device itself straddling the glass lens at the broken place and secured to the lens without the employment of additional screws or rivets.

The invention is disclosed in the drawing hereto attached in which,

Figure 1 is a view of a pair of eyeglasses of which one lens is mounted in the usual manner, not having been broken, and the other lens which has been broken, is mounted by the improved repair device. Fig. 2 shows an unmounted lens that has been broken. Fig. 3 is a flat blank of two segment-shaped jaws. Fig. 4 is a section view, on a somewhat larger scale of a broken lens and the metal repair device attached thereto. Fig. 5 is also a section view showing the repair device and lens also the forked post secured in position and showing the repair completed. Fig. 6 shows a broken lens properly repaired.

This repair device may be used on rimless lenses whether they are mounted as eyeglasses or spectacles.

Referring to the drawing the rimless lens, that has been broken is designated, 8; the other lens, 9, is whole. It will be seen that with the whole lens, 9, a post, 10, is employed that has two forks, 11; these forks straddle the edge of the glass lens, and a screw, 12, passes through a hole in each fork and also through a hole, 14, in the lens. The most frequent form of break in these rimless lenses, is that illustrated in Fig. 2, where a rounded broken-edge notch, 7, is shown, and a portion of the screw-hole, 14, in the lens is also shown. The small indent, 15, seen in Figs. 2, 4 and 5, is only a slight depression in the surface of the lens, and is not a hole through the lens. An indent of this kind is on opposite sides of the glass lens.

The object of the present invention is a repair device to enable broken lenses to be remounted and continued in use.

One form of my repair device has a metal clip comprising two segment-shaped clamp-jaws, 16, the curved parts of the segments being connected by a ligament, 17; this is shown in its primary condition, in the flat state, in Fig. 3. In the finished condition of the device the ligament, 17, at its joinder with each clamp-jaw has a right-angle bend, 18, and the outline edges of the two jaws have parallel position. The curved part of the segment of each clamp-jaw has position that corresponds with the curved edge of the lens, 8, and therefrom each jaw tapers V-shape to a tang-point, 19, where, on its inner surface, each jaw has a small projecting spud, 20; the two small spuds, 20, as seen in Fig. 4, point toward each other, and these two spuds fit into the small indents, 15, on opposite sides of the glass lens. Each jaw has a screw-hole, 21, whose position registers or coincides with the screw-holes in the forks of the post.

When the device is in position the segment-shaped clamp jaws, 16, cover the broken notch, 7, of the lens; then the forks, 11, of the post, 10, are slipped over the ligament, 17, and take position on the sides of the jaws, 16, and the screw, 12, is entered and extends through the hole in each fork, through the hole, 21, in each clamp jaw, and through the fractured place, 7, of the lens. When the screw has been tightened the effect is to press the two spuds, 20, into the two indents, 15, and thereby the repair device and the forked post, 10, are firmly held to their position on the glass lens, 8.

It is not practicable in so small a device to make drawings that will indicate the actual relative sizes of the several parts of the device, and in actual practice the parts of the two clamp jaws, 16, which extend over or cover the broken notch, 7, of the lens, will have such thickness as will permit straddling by the same forked post that had been used on the glass lens before it was broken.

Having thus described my invention what I claim and desire to secure by Letters Patent is:—

1. A repair device for rimless lenses for eye-glasses or spectacles, consisting of a metal clip having two segment-shaped clamp-jaws the curved parts of the two segments being connected by a ligament, and both jaws having a V-shape the point of which is provided on its inner surface with a spud adapted to fit into an indent formed on the surface of a glass lens, and each jaw provided with a screw-hole, the two screw-holes of the two jaws coinciding in position to permit the same screw to enter both holes.

2. A repaired broken glass lens for eye-glasses or spectacles, comprising the broken lens having an indent on its two opposite surfaces; two segment-shaped clamp-jaws connected by a ligament and both jaws having a tang-point and each point provided on its inner surface with a spud which fits into the said indents on the glass lens; a forked post straddling the said clamp-jaws; and a screw extending through the forks of the post and also through the clamp-jaws and compressing the said spuds into the indents on the opposite side of the glass.

In testimony whereof I affix my signature in presence of two witnesses.

GEORGE ALBERT HILBERT.

Witnesses:
 JOHN W. HOWE,
 CHAS. B. MANN.

---

Copies of this patent may be obtained for five cents each, by addressing the "Commissioner of Patents, Washington, D. C."